(No Model.)
F. J. HUELSEN & J. NAGAL.
VEHICLE WHEEL.
No. 477,659. Patented June 28, 1892.
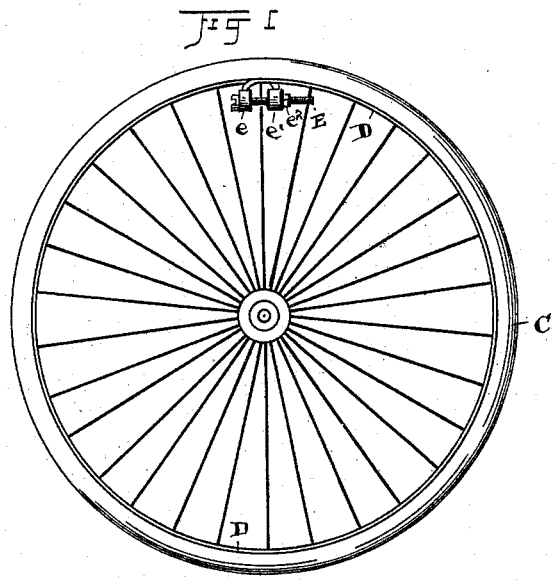
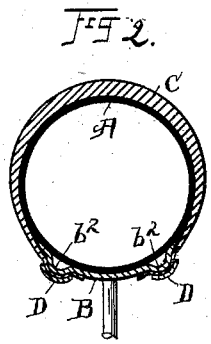
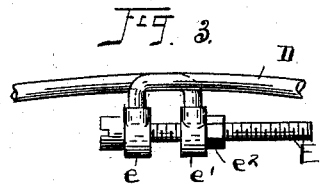
Attest.
R. B. Moser.
H. L. McLane.
By
H. T. Fisher
Inventors
Felix J. Huelsen
Jacob Nagal.
Attorney.

UNITED STATES PATENT OFFICE.

FELIX J. HUELSEN AND JACOB NAGAL, OF CLEVELAND, OHIO.

VEHICLE-WHEEL.

SPECIFICATION forming part of Letters Patent No. 477,659, dated June 28, 1892.

Application filed October 31, 1891. Serial No. 410,429. (No model.)

*To all whom it may concern:*

Be it known that we, FELIX J. HUELSEN and JACOB NAGAL, citizens of the United States, residing at Cleveland, in the county of Cuyahoga and State of Ohio, have invented certain new and useful Improvements in Vehicle-Wheels; and we do hereby declare that the following is a full, clear, and exact description of the invention, which will enable others skilled in the art to which it appertains to make and use the same.

Our invention relates to vehicle-wheels, but is more especially intended and used for bicycle-wheels, and particularly with that class of wheels which employ flexible or inflatable tubes about the periphery of the wheel to cushion the vibrations to the rider.

The object of the invention is to improve the means whereby such tubes are confined in position and to facilitate the removal and the attachment of the cover by which said tube is held and protected.

In the accompanying drawings, Figure 1 is a side elevation of a wheel equipped with our improved holding mechanism. Fig. 2 is a cross-section, enlarged, of the wheel-rim and the parts about the same and connected therewith, as hereinafter more fully described; and Fig. 3 is an enlarged elevation of the style of mechanism shown in Fig. 1 for expanding and contracting the locking rings or bands on the wheel.

In the style of wheel herein referred to the flexible tube A usually is made of rubber and filled with compressed air, so as to be firm enough to sustain the load and afford a practically solid bearing for the wheel and yet yielding sufficiently that on a more or less rough road-bed the unavoidable jar is taken up or absorbed by the tube, and the rider thus relieved therefrom. This tube is laid in the trough of the rim B, which is concave in cross-section and of sufficient depth to confine the tube between its upwardly-extended edges. Thus supported on or around the periphery of the wheel the tube is provided with a cover C, having a base of any suitable fabric and built up with rubber to take the tread and wear on the wheel. The edges of the cover are confined upon the rim B. The rim B has a bead $b^2$ on each side struck up near each edge and extending entirely around the same, and the locking band or ring D is formed in cross-section to fit over this bead. The cover at each side overlaps the said bead and is engaged by the locking-band bound tightly upon and over the same. By reason of the shoulders produced by the bead and the engaging-edges of the band where they press hard upon the cover on either side of the bead the cover is securely held and cannot draw or work out and all parts or points thereof are held with uniform security.

In Fig. 3 we show one way of connecting the ends of the said rings to expand them into locking position or to contract them when the cover is to be released. This is done by means of a screw-bolt E, having two heads $e$ and $e'$ thereon and each connected with one end of ring D. The head $e$ does not travel on the bolt; but the head $e'$ is threaded to move back and forth as the bolt is turned, a jam-nut $e^2$ serving in this instance to fix the limit of outward movement. Turning the bolt in one way the heads $e$ and $e'$ are carried apart and the ring is expanded into its seat, and turning it the other way it is contracted for removal. Any other equivalent way of getting these results or movements may be adopted.

This construction not only affords simple means for securing the cover, but it tends to greatly strengthen the rim B toward its edges, where strength and firmness are required.

Having thus described our invention, what we claim as new, and desire to secure by Letters Patent, is—

1. A wheel having an expansible tube around its periphery and a rim for said tube having circumferential beads on each side of its center, in combination with a flexible cover stretched over the said tube and overlapping the said beads on the inside of the rim and expansible locking-rings on the inside of said rim constructed with grooves adapted to said beads and having edges bearing on the overlapping edges of the said cover, substantially as described.

2. A wheel having a rim with circumferential beads on both sides of its center, a tube surrounding said rim, a flexible cover over said tube having its edges lapped over on the inside of the said rim, and expanding band-rings inside of said rim bearing on said overlapping edges of the cover, said rings having each a central groove and sharp edges on each side of the groove to engage the cover, substantially as described.

Witness our hands to the foregoing specification.

FELIX J. HUELSEN.
JACOB NAGAL.

Witnesses:
H. T. FISHER,
NELLIE L. McLANE.